(12) United States Patent
Miller et al.

(10) Patent No.: US 10,040,676 B2
(45) Date of Patent: *Aug. 7, 2018

(54) VEHICLE AND ENVIRONMENTAL DETECTION SYSTEM

(71) Applicant: Hyster-Yale Group, Inc., Fairview, OR (US)

(72) Inventors: Thomas Kenan Miller, Greenville, NC (US); Alan H. Fitzsimmons, Greenville, NC (US); Stephen A. Moore, Greenvile, NC (US); Allen Brock, Greenville, NC (US)

(73) Assignee: HYSTER-YALE GROUP, INC., Fairview, OR (US)

( * ) Notice: Subject to any disclaimer, the term of this patent is extended or adjusted under 35 U.S.C. 154(b) by 74 days.

This patent is subject to a terminal disclaimer.

(21) Appl. No.: 15/257,170

(22) Filed: Sep. 6, 2016

(65) Prior Publication Data
US 2016/0376136 A1 Dec. 29, 2016

Related U.S. Application Data

(63) Continuation of application No. 14/525,055, filed on Oct. 27, 2014, now Pat. No. 9,459,349.

(51) Int. Cl.
*B60R 22/00* (2006.01)
*B66F 17/00* (2006.01)
(Continued)

(52) U.S. Cl.
CPC .............. *B66F 17/003* (2013.01); *B60Q 1/00* (2013.01); *B60Q 1/0035* (2013.01); *B60Q 1/143* (2013.01); *B60Q 1/24* (2013.01); *B60T 7/12* (2013.01); *B60T 7/22* (2013.01); *B60W 30/143* (2013.01); *B62D 6/00* (2013.01); *B66F 9/065* (2013.01); *B66F 9/0755* (2013.01); *B66F 9/07504* (2013.01); *G01S 15/04* (2013.01);
(Continued)

(58) Field of Classification Search
CPC .... B66F 17/003; B66F 9/065; B66F 9/07504; B66F 9/0755; B60Q 1/00; B60Q 1/0035; B60Q 1/143; B60Q 1/24; B60T 7/12; B60T 7/22; G01S 15/04; G01S 15/08; G01S 15/88
USPC ........................ 701/49, 36, 37, 117, 118, 408
See application file for complete search history.

(56) References Cited

U.S. PATENT DOCUMENTS

| 4,500,977 A | 2/1985 | Gelhard |
|---|---|---|
| 8,103,418 B2 | 1/2012 | Osswald |

(Continued)

*Primary Examiner* — Thomas G Black
*Assistant Examiner* — Luat T Huynh
(74) *Attorney, Agent, or Firm* — Schwabe Williamson & Wyatt

(57) ABSTRACT

A system includes a detection device configured to transmit and receive one or more signals in a generally vertical direction above a vehicle. Additionally, the system may include a processing device configured to measure a time of flight associated with the transmission and receipt of the one or more signals in the generally vertical direction. A distance travelled by the one or more signals may be determined based, at least in part, on the measured time of flight, and the distance travelled may be compared with a threshold distance to determine an overhead clearance of the vehicle. In response to determining the overhead clearance, a vehicle system may be activated.

20 Claims, 12 Drawing Sheets

(51) Int. Cl.

| | | |
|---|---|---|
| *G01S 15/08* | (2006.01) | |
| *G01S 17/08* | (2006.01) | |
| *B60Q 1/00* | (2006.01) | |
| *B62D 6/00* | (2006.01) | |
| *B60W 30/14* | (2006.01) | |
| *B60T 7/12* | (2006.01) | |
| *B60T 7/22* | (2006.01) | |
| *G01S 17/02* | (2006.01) | |
| *G01S 17/88* | (2006.01) | |
| *G01S 15/04* | (2006.01) | |
| *G01S 15/88* | (2006.01) | |
| *B60Q 1/14* | (2006.01) | |
| *B60Q 1/24* | (2006.01) | |
| *B66F 9/065* | (2006.01) | |
| *B66F 9/075* | (2006.01) | |

(52) U.S. Cl.
CPC .............. *G01S 15/08* (2013.01); *G01S 15/88* (2013.01); *G01S 17/026* (2013.01); *G01S 17/08* (2013.01); *G01S 17/88* (2013.01); *B60Q 2300/30* (2013.01); *B60Q 2300/33* (2013.01); *B60T 2201/022* (2013.01)

(56) References Cited

U.S. PATENT DOCUMENTS

| | | | |
|---|---|---|---|
| 8,527,141 | B2 | 9/2013 | Takahashi |
| 8,538,636 | B2 | 9/2013 | Breed |
| 9,309,099 | B2 * | 4/2016 | Dal Dosso .............. B66F 9/183 |
| 2008/0147253 | A1 | 6/2008 | Breed |
| 2012/0107077 | A1 * | 5/2012 | Alveteg ................. B66F 9/0755 |
| | | | 414/667 |
| 2013/0297151 | A1 * | 11/2013 | Castaneda .......... B62D 15/0265 |
| | | | 701/41 |
| 2017/0015537 | A1 * | 1/2017 | Bosworth, III ....... B66F 9/0755 |
| 2017/0043988 | A1 * | 2/2017 | Lee .......................... B66F 9/24 |

* cited by examiner

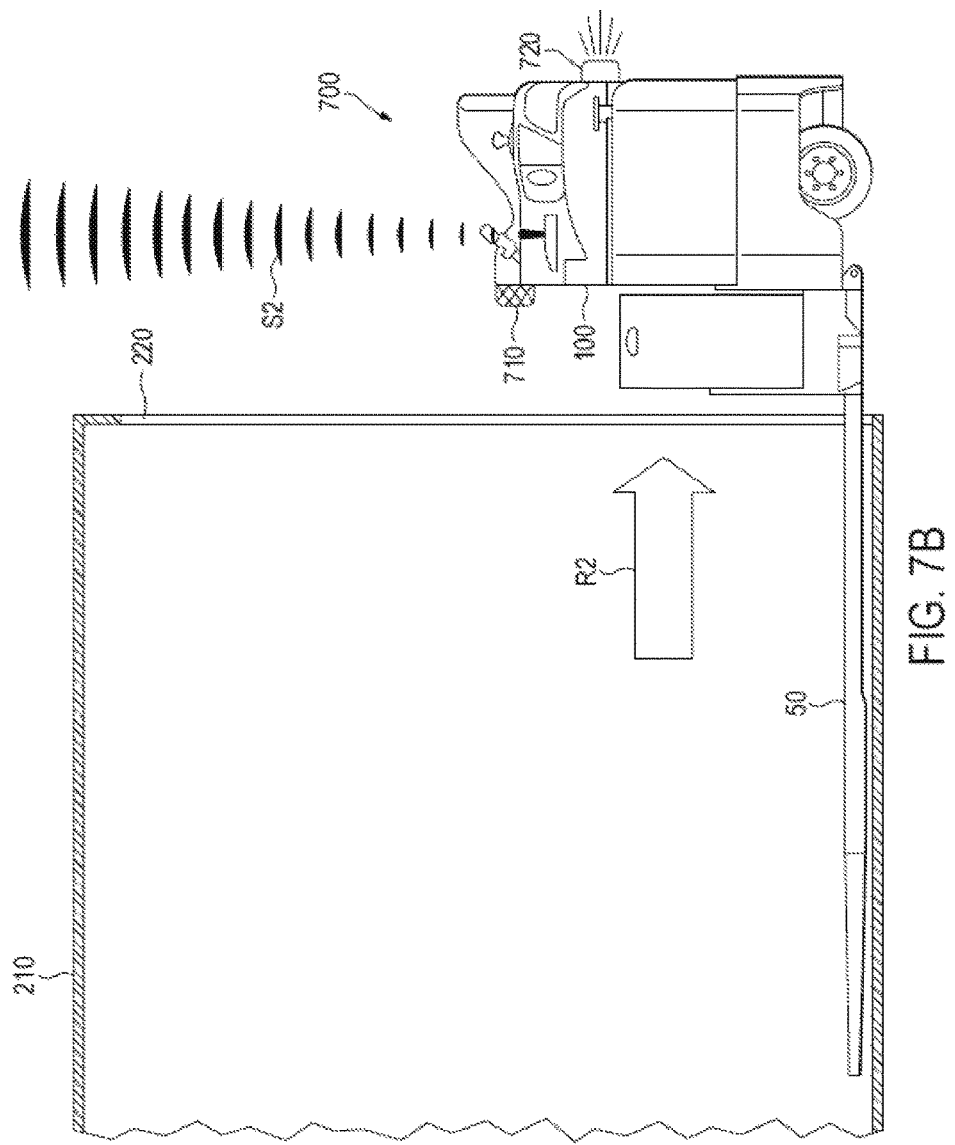

VEHICLE AND ENVIRONMENTAL DETECTION SYSTEM

STATEMENT OF RELATED MATTERS

This application claims priority to and is a continuation of U.S. application Ser. No. 14/525,055, filed on Oct. 27, 2014 and entitled Vehicle and Environmental Detection System, the contents of which are herein incorporated by reference in their entirety.

TECHNICAL FIELD

This application relates to the field of vehicle and environmental detection systems including automated control of one or more vehicle related systems.

BACKGROUND

Vehicle systems may be configured to detect various operating and/or environmental parameters such as being able to distinguish lighting conditions associated with operating in the day versus operating at night. For example, known automobile lighting systems may be configured to automatically turn on a headlight at dusk, and to automatically turn off the headlight at dawn. Automation of the headlights provides a convenience to the vehicle operator, in terms of reducing the reliance on manual manipulation of operator controls. Additionally, by using a vehicle system to automatically turn on the lights based on a diminished amount of surrounding light, the operator does not need to remember to turn on the lights or to make an independent determination as to when it is sufficiently dark to turn on the lights.

In some operating environments, the amount or level of surrounding light may vary at frequent and/or irregular intervals, which may result in known automated light systems intermittently turning on and off the vehicle lights, or causing a delay to turn the lights on. Additionally, sensors used in known automated light systems may detect the amount or level of light differently depending on the source of the light and/or depending on the light frequency. For example, known light systems may respond differently to light generated from an artificial or man-made light source as compared to sunlight.

Known automated light systems operate based on the amount or level of light that is received at the vehicle itself. An operator of the vehicle that is exposed to a high level of light may want to have visibility some distance ahead of the vehicle to a location which is not exposed to the high level of light. Accordingly, any object or obstacle which is positioned in a location with a low level of light may not be readily visible to the operator without additional light provided by the vehicle headlights. Additionally the amount or level of light received by the sensor may vary according to the position of the sensor on the vehicle relative to the light source.

This application addresses these and other problems.

SUMMARY

A system for detecting one or more environmental parameters may include a detection device configured to transmit and receive one or more signals in a generally vertical direction above a vehicle. Additionally, the system may include a processing device configured to measure a time of flight associated with the transmission and receipt of the one or more signals in the generally vertical direction. A distance travelled by the one or more signals may be determined based, at least in part, on the measured time of flight, and the distance travelled may be compared with a threshold distance to determine an overhead clearance of the vehicle. In response to determining the overhead clearance, a vehicle system may be activated.

A method for detecting one or more environmental parameters may include transmitting one or more signals in a generally vertical direction above a vehicle, wherein the vehicle is associated with a vehicle system, and receiving the one or more signals. The method may further comprise measuring the time of flight associated with the transmission and receipt of the one or more signals in the generally vertical direction and determining, based at least in part on the measured time of flight, a distance travelled by the one or more signals. The distance travelled by the one or more signals may be compared with a threshold distance to determine an overhead clearance of the vehicle and, in response to determining the overhead clearance, the vehicle system may be activated.

BRIEF DESCRIPTION OF THE DRAWINGS

FIG. 7B illustrates the example environmental detection system of FIG. 7A in a second mode of operation.

DETAILED DESCRIPTION

Figure 1:
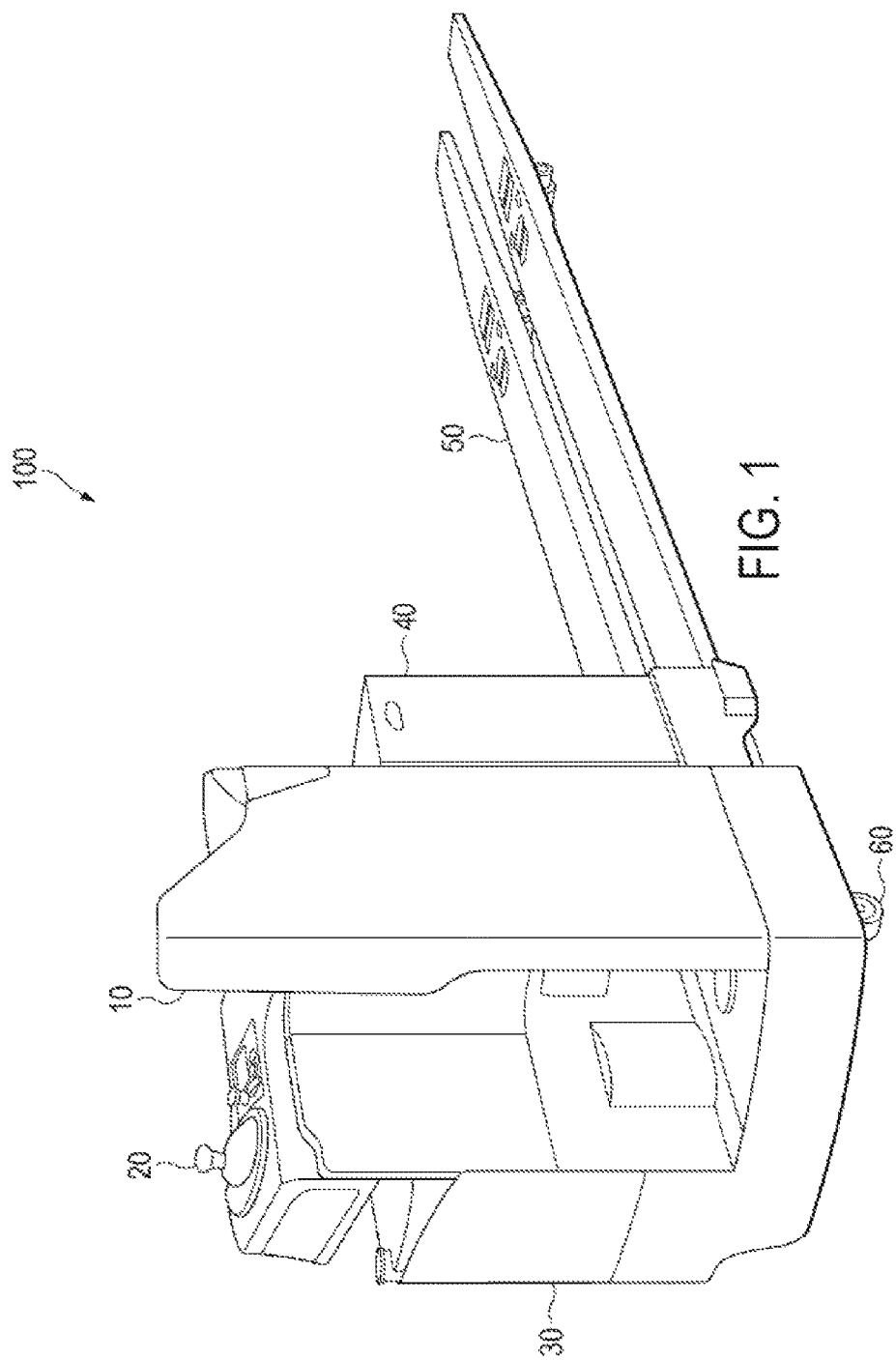
FIG. 1 illustrates an example vehicle comprising a plurality of operating systems.

FIG. 1 illustrates an example vehicle 100 comprising a plurality of operating systems. The vehicle 100 is illustrated as including a vehicle frame 10 with a pair of forks 50 configured to transport materials and/or goods. Other operating systems of vehicle 100 may comprise a steering system 20 and a traction system 30. In some examples, a vehicle such as a forklift may comprise a hoist system which is configured to raise and lower the forks. Additionally, vehicle 100 may comprise a battery 40 for providing power to operate the one or more systems. One or more of steering system 20, traction system 30, other types of vehicle systems such as a hoist system, or any combination thereof may be controlled by an operator of vehicle 100. Additionally, vehicle 100 may comprise one or more wheels or rollers 60 which may be powered by traction system 30 and/or caused to turn by steering system 20.

The example vehicle 100 shown in FIG. 1 is a warehouse pallet truck for illustrative purposes only. Other types of vehicles are contemplated, and the environmental detection systems and automated control systems described herein are not limited to the specific type or types of vehicles illustrated or otherwise described with reference to the drawings.

Figure 2:
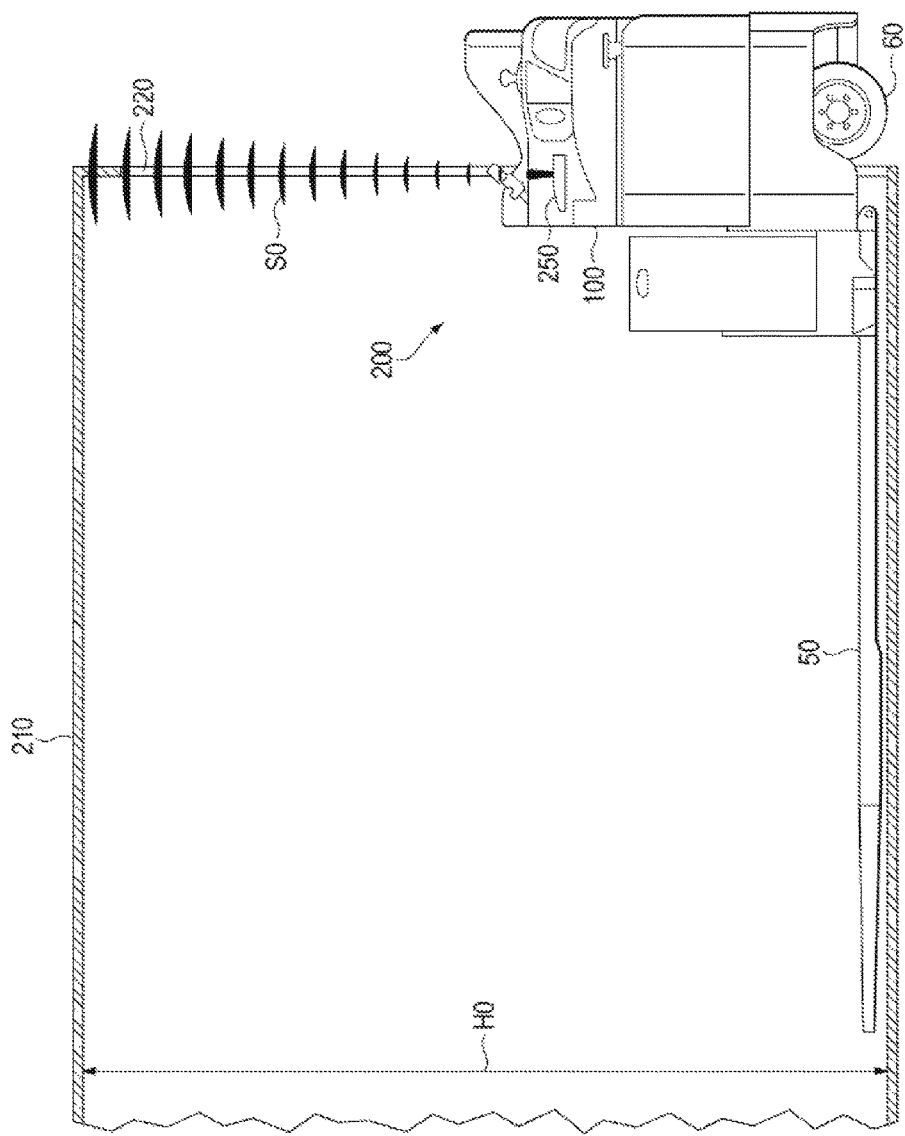
FIG. 2 illustrates an example environmental detection system.

FIG. 2 illustrates an example environmental detection system 200 including a sensor 250 mounted on a vehicle, such as vehicle 100. Vehicle 100 is illustrated as having partially entered through an entrance 220 of an area of operation 210 having a reduced overhead clearance. For example, area of operation 210 may comprise a shipping container, a trailer, a drive-in freezer room, a stock room, a warehouse, a building, other types of structures, or any combination thereof. Additionally, area of operation 210 may be associated with a height H0.

In some examples, vehicle 100 may be entering area of operation 210 after being operated outdoors or in another area with a substantially greater overhead clearance. As illustrated in FIG. 2, forks 50 of vehicle 100 have entered area of location 210 whereas the portion of the vehicle above wheels 60 remains outside of entrance 220.

Sensor 250 may be mounted to vehicle 100 at or near a top surface of vehicle 100. Additionally, sensor 250 may be configured to transmit signals S0 in a generally upward direction in order to detect the entrance 220 and/or to detect the reduced overhead clearance associated with area of operation 210. Signals S0 may be received by sensor 250 after having been reflected from the surface of entrance 220 and/or from a ceiling of area of operation 210. In some examples, sensor 250 may comprise an acoustic or ultrasonic sensor that is configured to transmit and receive acoustic or ultrasonic signals, in a similar manner as sonar or echo location devices. In other examples, sensor 250 may comprise a laser range finder or other type of optical device configured to measure distance.

The length of time that it takes for signals S0 to return to sensor 250 may be used to determine height H0. Although height H0 is shown as being measured from the floor of area of operation 210, in some examples, height H0 may be used to determine the amount of overhead clearance of vehicle 100, e.g., the distance from the top surface of vehicle 100 to the entrance 220 and/or ceiling of area of operation 210.

Based, at least in part, on input received from sensor 250 and/or from the determined height H0 of area of operation 210, system 200 may be configured to activate, deactivate, vary, change, modify, restrict, disable, prohibit, monitor, or otherwise control one or more vehicle systems, such as the vehicle systems described with reference to FIG. 1. In some examples, when a reduced overhead clearance is detected, system 200 may be configured to restrict a maximum travel speed of vehicle 100, to activate a reduced vehicle speed or creep speed, to restrict a maximum lift height of forks 50, to increase the allowable steering control associated with wheels 60, to disable a vehicle coast control system, to engage a vehicle braking system, to generate an alert, to disable a vehicle mode of operation, to enable a vehicle mode of operation, to activate one or more vehicle lights, to sound a vehicle horn, to transmit a notification to a fleet management system, to identify a location of vehicle 100, to control other vehicle functions, or any combination thereof.

Figure 3:
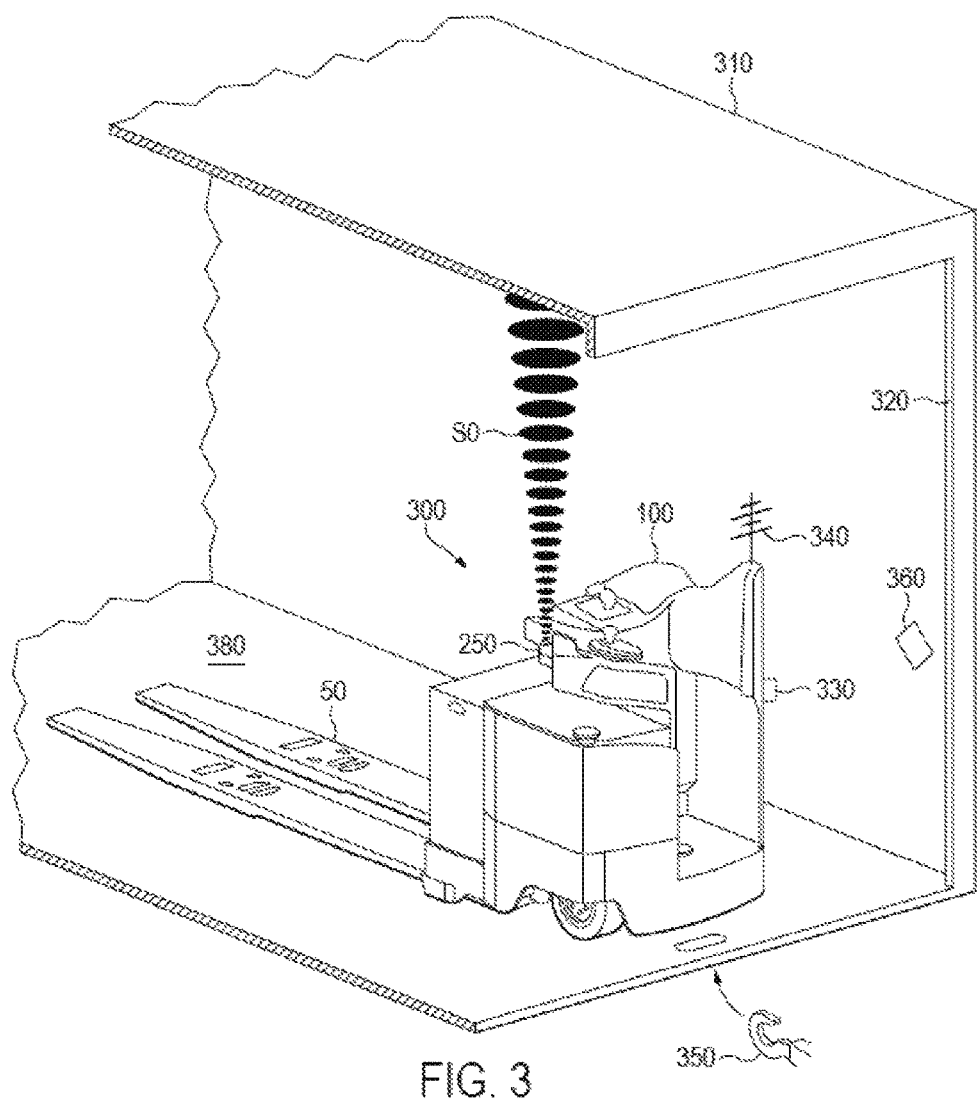
FIG. 3 illustrates an example environmental detection system associated with entry of a vehicle into a trailer.

FIG. 3 illustrates an example environmental detection system 300 associated with entry of a vehicle, such as vehicle 100 of FIG. 1, into a trailer 310. Semis or tractor trailers, such as trailer 310, may be used to transport goods and materials. When trailer 310 arrives at the intended destination, a material handling vehicle is often used to unload the goods from trailer 310. Similarly, a material handling vehicle may be used to load or re-load goods to trailer 310.

Vehicle 100 is illustrated as having just passed through an entrance 320 to trailer 310 in a forks-first direction, that is, forks 50 are pointed towards the back 380 of trailer 310. In addition to sensor 250 configured to detect the height of trailer 310, system 300 may comprise one or more vehicle detection devices, such as a vehicle detection device 330 and a trailer detection device 360. Vehicle detection device 330 may comprise a sensor, a receiver, a reader, a scanner, an optical character recognition (OCR) device, other types of detection devices, or any combination thereof. In some examples, detection device 330 may be configured to determine an identification of trailer 310 based on the detection of trailer detection device 360 located at or near entrance 320 of trailer 310.

Trailer detection device 360 may comprise a transmitter, a chip, a magnetic strip, a barcode, a universal product code (UPC), a bill of goods, a stock keeping unit (SKU) code, a quick response (QR) code, other types of identification devices, or any combination thereof. In some examples, vehicle detection device 330 and trailer detection device 360 operate as near-field communication devices, using radio-frequency identification (RFID), blue tooth, or other types of wireless communication technologies to transmit identification information.

Vehicle 100 may comprise a transmitter 340. Transmitter 340 may be configured to transmit information and/or instructions that indicate the presence of vehicle 100 within trailer 310. In response to the transmission, a securing system 350 may be configured to prohibit trailer 310 from being moved while vehicle 100 is inside. For example, securing system 350 may temporarily anchor trailer 310 to a loading dock. The information and/or instructions that indicate the presence of vehicle 100 may be transmitted to a control device associated with securing system 350. The control device may be located in securing system 350, in trailer 310, in the truck cab, or in the loading dock, by way of example.

In still other examples, trailer detection device 360 may be configured to detect the presence of vehicle 100 based on the proximity of vehicle detection device 330. As vehicle detection device 330 passes trailer detection device 360 upon entry of vehicle 100 into the entrance 320 of trailer 310, trailer detection device 360 may be configured to activate and/or engage securing system 350. When vehicle 100 exits trailer 310, trailer detection device 360 may be configured to deactivate and/or release securing system 350 upon detecting the second passage of vehicle detection device 330. In some examples, in addition to detecting the presence of vehicle 100, trailer detection device 360 may be configured to determine the identity of vehicle 100. One or both of the presence and identity of vehicle 100 may be provided to the control device associated with securing system 350.

Figure 4:
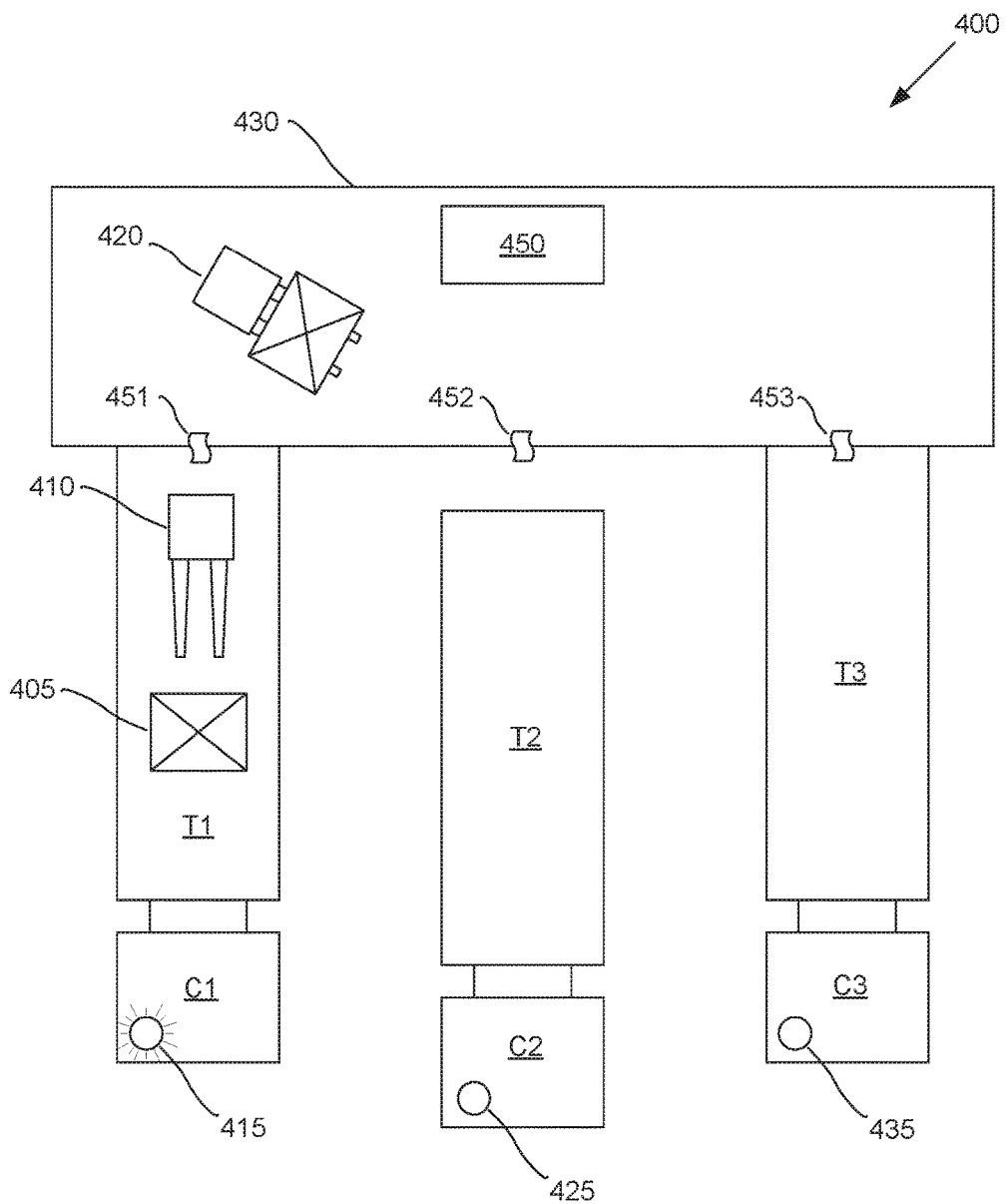
FIG. 4 illustrates an example environmental detection system associated with loading dock management.

FIG. 4 illustrates an example environmental detection system 400 associated with loading dock management. A loading dock 430 may be configured to service a plurality of truck/trailers, such as a first trailer T1, a second trailer T2, and a third trailer T3, for shipping and/or receiving goods and materials. Additionally, a plurality of material transport vehicles, such as a first forklift 410 and as second forklift 420, may be used to facilitate the transfer of goods into or out of the trailers.

First forklift 410 is illustrated as being inside of first trailer T1 and preparing to transport a load 405. First trailer T1 may be locked to loading dock 430 via a first securing system 451 while first forklift 410 is inside. In some examples, the presence of first forklift 410 may be transmitted and/or otherwise communicated to a dock management control system 450. Additionally, the identification of one or both of first forklift 410 and first trailer T1 may be transmitted and/or otherwise communicated to dock management control system 450.

First securing system 451 may be configured to prohibit first trailer T1 from departing loading dock 430 in a first mode of operation in which first securing system 451 is activated. First securing system 451 may be activated in response to the determination that first forklift 410 has entered a confined space, such as first trailer T1. Additionally, first securing system 451 may be deactivated in a second mode of operation in response to the determination that first forklift 410 has exited first trailer T1. First trailer T1 may be allowed to depart from loading dock 430 in the second mode of operation.

Dock management control system 450 may receive similar information associated with other trailers and/or forklifts that are in operation on loading dock 430. In some examples, dock management control system 450 may be configured to control one or more securing devices, such as first securing system 451, a second securing system 452, and a third securing system 453 based, at least in part, on the received forklift and/or trailer information. Dock management control system 450 may use the information to determine which securing system should be engaged or disengaged.

In some examples, information associated with the presence of a forklift may be transmitted and/or otherwise communicated to an operator within a truck cab, such as first truck cab C1. When the presence of first forklift 410 is detected within first trailer T1, a first alert 415 may be activated within first truck cab C1 to notify the truck operator. First alert 415 may comprise an audible or visible alert. In some examples, first alert 415 may be activated anytime that first securing system 451 is engaged.

Second trailer T2 is illustrated as leaving loading dock 430 after having been unloaded by second forklift 420. After second forklift 420 exited from second trailer T2, second securing system 452 may be disengaged to allow second trailer T2 to depart from loading dock 430. In some examples, a second alert 425 in a second cab C2 associated with second trailer T2 may be deactivated when the presence of second forklift 420 is no longer detected within second trailer T2. Although third trailer T3 and an associated third truck cab C3 is shown docked to loading dock 430, since there is no forklift present within third trailer T3, a third alert 435 in third truck cab C3 may not be active.

Figure 5:
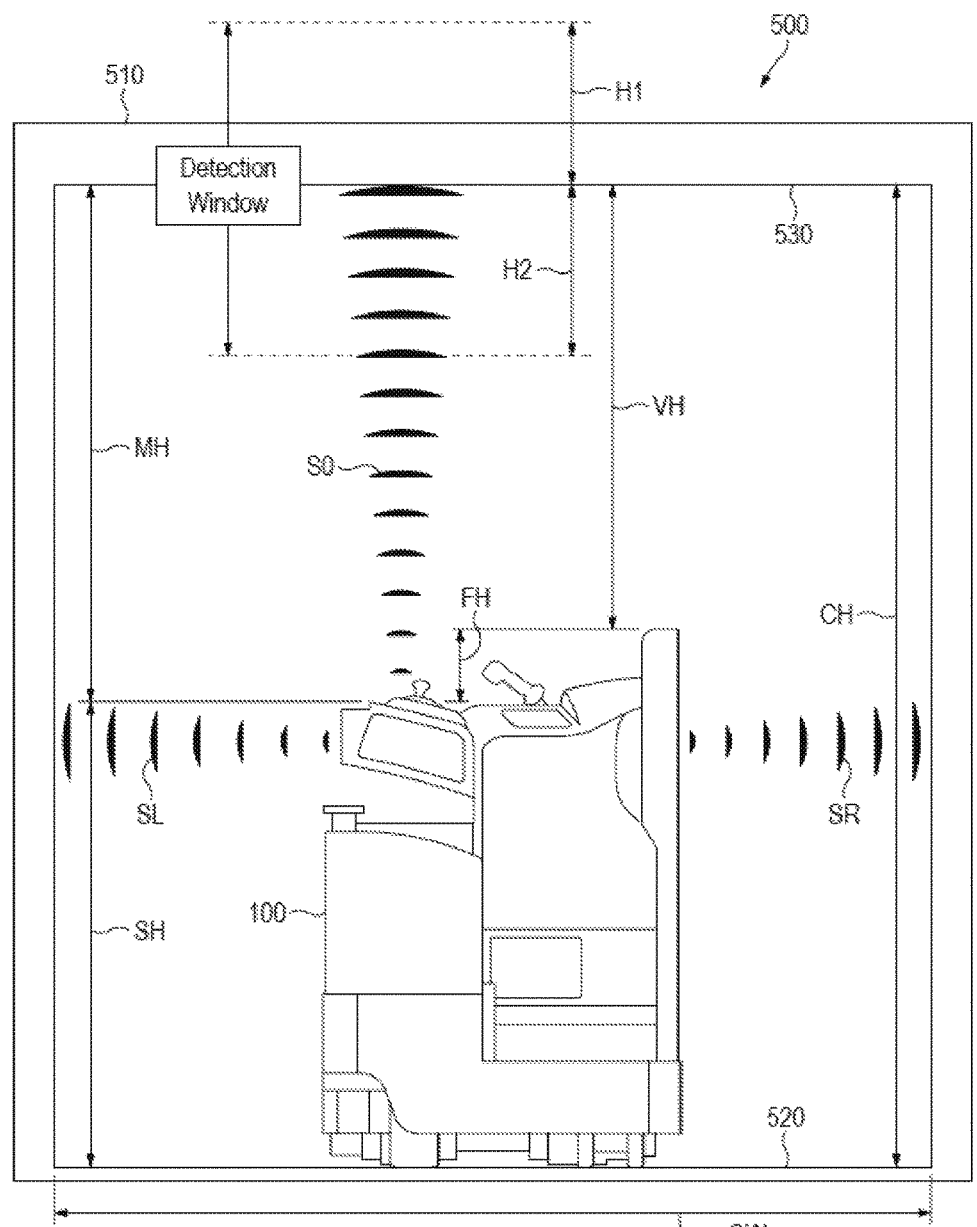
FIG. 5 illustrates a further example environmental detection system comprising multi-dimensional sensing devices.

FIG. 5 illustrates a further example environmental detection system 500 comprising multi-dimensional sensing devices for evaluating a containment 510. In some examples, containment 510 may comprise a shipping container, a trailer, a drive-in freezer room, a stock room, or other types of confined spaces.

In addition to signals S0 transmitted in a generally upward direction in order to detect a height CH associated with containment 510, system 500 may comprise a number of sensors configured to generate one or more signals that detect a width CW associated with containment 510. For example, a first signal SL may be configured to detect a lateral clearance of vehicle 100 in a first direction, e.g., a left-side direction, and a second signal SR may be configured to detect a lateral clearance of vehicle 100 in a second direction, e.g., a right-side direction. In some examples, the input associated with first signal SL and second signal SR may be combined and/or otherwise used to determine width CW.

System 500 may be configured to determine, based on the input received from one or more of signal S0, first signal SL, and second signal SR, that vehicle 100 is being operated in containment 510 associated with a specific height and/or width. The specific height and/or width of containment 510 may be used to system 500 activate, deactivate, vary, change, modify, restrict, disable, prohibit, monitor, or otherwise control one or more vehicle systems, such as the vehicle systems described with reference to FIG. 1.

Additionally, system 500 may be configured to perform different preset operations according to the dimensions of containment 510. For example, a containment having a first dimension may be associated with a first set of predetermined operations and a containment having a second dimension may be associated with a second set of predetermined operations. The dimensions of containment 510 may be used to differentiate different types of containment categories. Each category may be associated with a different set of predetermined operations.

In some examples, first signal SL and/or second signal SR may be used to confirm that the signal S0 is properly identifying a reduced overhead clearance VH as a result of vehicle being located within containment 510. Having redundant or secondary environmental input may be used to distinguish when vehicle 100 has a reduced overhead clearance as a result of operating under a rack or some type of obstacle rather than being operated within a containment structure, such as containment 510.

One or more sensors associated with the generation of signal S0 may be associated with a sensor height SH above a container floor 520. Sensor height SH may be associated with a preset or predetermined distance corresponding to the location where the one or more sensors are located on vehicle 100. Additionally, a vertical distance FH between the one or more sensors and the top of the vehicle frame may be predetermined and/or determined for the particular vehicle 100 in question. The sum of the sensor height SH and the vertical distance FH of the vehicle frame may be used to determine an overall height of vehicle 100 when measured from container floor 520. Additionally, a signal height MH to a container top 530 may be determined for the one or more sensors that are used to generate signal S0. In some examples, the difference between signal height MH and the vertical distance FH of the vehicle frame may be used to determine the overhead clearance VH. Similarly, the container height CH may be determined by taking the sum of sensor height SH and signal height MH.

One or more of the sensors used in system 500 may be configured with a detection window or an operating range having a minimum value H2 and a maximum value H1. Certain types of containers, such as trailers, may be manufactured in one or more standard sizes. The standard sizes may vary from several inches to one or more feet from each other. In some examples, minimum value H2 may be set at the smallest standard size associated with standard trailer sizes and the maximum value H1 may be set at the largest standard size associated with standard trailer sizes. System 500 may be configured to determine that vehicle 100 is within a trailer if the input from signal S0 indicates a distance which falls anywhere within the operating range of H1 and H2.

The operating range may be used by system 500 to filter out deviations in ceiling height, e.g., to provide for some tolerance based on structural irregularities or projections within containment 510. Additionally, the operating range may be used to reduce or eliminate any noise or signal irregularities that may cause some fluctuation in measured height CH of containment 510.

Figure 6:
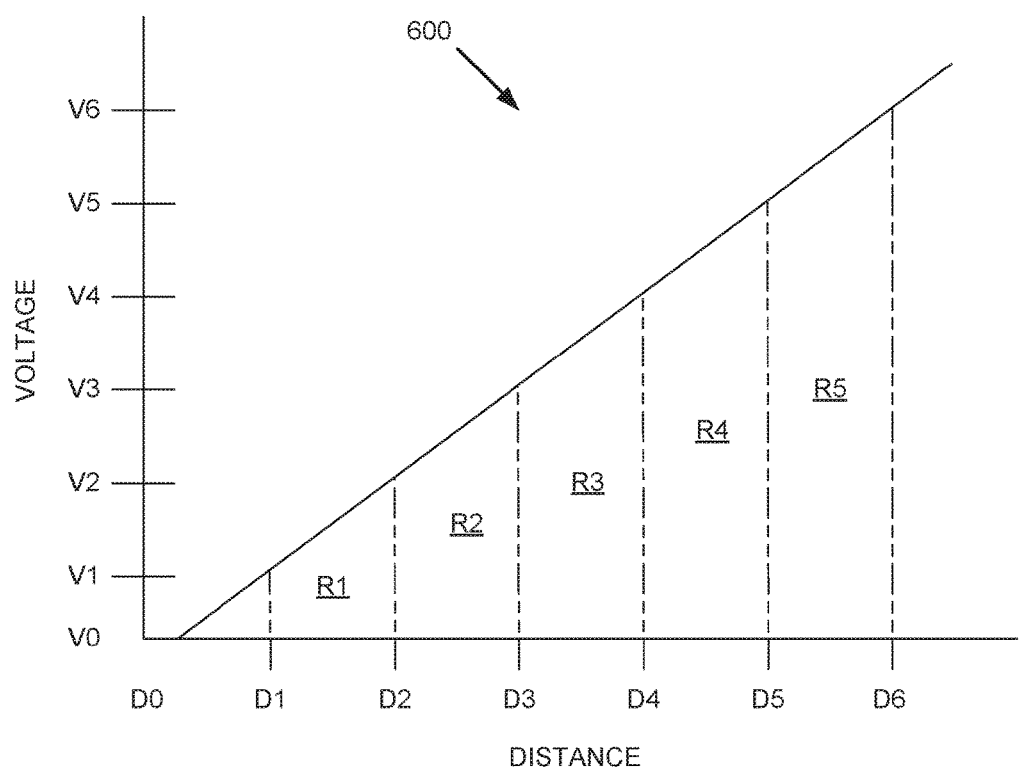
FIG. 6 illustrates a graph of example operating ranges for an environmental detection system.

FIG. 6 illustrates a graph 600 of example operating ranges for an environmental detection system. In some examples, one or more sensors of the environmental detection system may be configured to generate an output that varies in voltage depending on the time of flight of a transmitted signal. For example, a transmitted signal that is reflected very quickly back to the sensor may result in a sensor output having a relatively low voltage, whereas a signal that takes longer to return to the sensor may cause the sensor to generate an output with a larger voltage. The amount of voltage may be used to determine the relative distance that the signal travelled and, therefore, the distance from the sensor to the object which reflected the signal.

The distances along the horizontal axis of graph 600 may be understood to indicate the overhead clearance or height of a structure located above a vehicle. In some examples, any distance that is less than a minimum distance D1 may be assumed to have a zero distance D0. A zero distance D0 may be associated with an output of zero voltage V0. Similarly, any distance that is greater than a maximum distance D6 may be understood as measuring infinity. Any distance measured greater than distance D6 may be associated with an output having a maximum voltage V6. For example, if a transmitted signal is never received by the sensor, such as when the vehicle is operating under the open sky, an output having maximum voltage V6 may be associated with the transmitted signal.

In some examples, a first range R1 may be associated between minimum distance D1 and a second distance D2. First range R1 may be associated with a lower threshold of an environmental detection system. In some example, first range R1 may be associated with a non-operational range of the environmental detection system in which one or more operations may be deactivated, disengaged, disabled, restricted, prohibited, terminated, turned off, or otherwise made non-operational.

A second range R2 may be associated between second distance D2 and a third distance D3. Second range R2 may correspond to a first category of environmental parameters. In some examples, the environmental detection system may be configured to perform a first set of one or more operations in response to detecting a first signal which indicates a first distance which falls within second range R2. The first set of operations may remain activated, engaged, enabled, turned on, or otherwise made operational unless the environmental detection system detects a subsequent signal which indicates a distance which falls outside of second range R2.

In some examples, the first set of operations may remain operational unless a number of consecutive signals are received, e.g., over a predetermined period of time, that fall outside of second range R2. The predetermined period of time may provide for a time delay to avoid intermittent activation and/or deactivation of the first set of operations.

A third range R3 may be associated between third distance D3 and a fourth distance D4. Third range R3 may correspond to a transition zone which does not operate to change or vary any vehicle system and/or mode of operation.

A fourth range R4 may be associated between fourth distance D4 and a fifth distance D5. Fourth range R4 may correspond to a second category of environmental parameters. In some examples, the environmental detection system may be configured to perform a second set of one or more operations in response to detecting a second signal which indicates a second distance which falls within fourth range R4. The one or more operations may remain activated, engaged, enabled, turned on, or otherwise made operational unless the environmental detection system detects a subsequent signal which indicates a distance which falls outside of fourth range R4.

In some examples, the second set of operations may remain operational unless a number of consecutive signals are received, e.g., over a predetermined period of time, that fall outside of fourth range R4. The predetermined period of time may provide for a time delay to avoid intermittent activation and/or deactivation of the first set of operations.

Third range R3 may act as a transitional zone between second range R2 and fourth range R4. The operational state associated with second range R2 or fourth range R4 may be maintained when the environmental detection system receives one or more subsequent signals that indicate a distance in third range R3. For example, the environmental detection system may initially receive a first set of signals which indicate a distance within second range R2. In response to receiving the first set of signals, the environmental detection system may be configured to perform a first set of one or more operations. The environmental detection system may subsequently receive one or more transitional signals, over a transition period, which indicate the distance has increased and is now within third range R3. The environmental detection system may continue to perform the first set of operations during the transition period.

Additionally, after receiving the transitional signals, the environmental detection system may receive a second set of one or more signals over an additional time period which indicate the distance has increased and is now within fourth range R4. In response to receiving the second set of signals, the environmental detection system may be configured to perform a second set of one or more operations.

The first net of operations may remain operational over a predetermined period of time that corresponds to the additional time period in which the second set of signals is received. For example, the environmental detection system may perform the second set of operations after the second set of signals has been received in the additional time period. In other examples, the first set of operations may remain operational over a predetermined period of time that considers, combines, or includes signals received under one or both of the transition period and the additional time period.

In still other examples, third range R3 may be associated with a non-operational range of the environmental detection system in which one or more operations may be deactivated, disengaged, disabled, restricted, prohibited, terminated, turned off, or otherwise made non-operational.

A fifth range R5 may be associated between fifth distance D5 and maximum distance D6. Fifth range R5 may be associated with an upper threshold of the environmental detection system. In some example, fifth range R5 may be associated with a non-operational range of the environmental detection system in which one or more operations may be deactivated, disengaged, disabled, restricted, prohibited, terminated, turned off, or otherwise made non-operational.

Figure 7A:
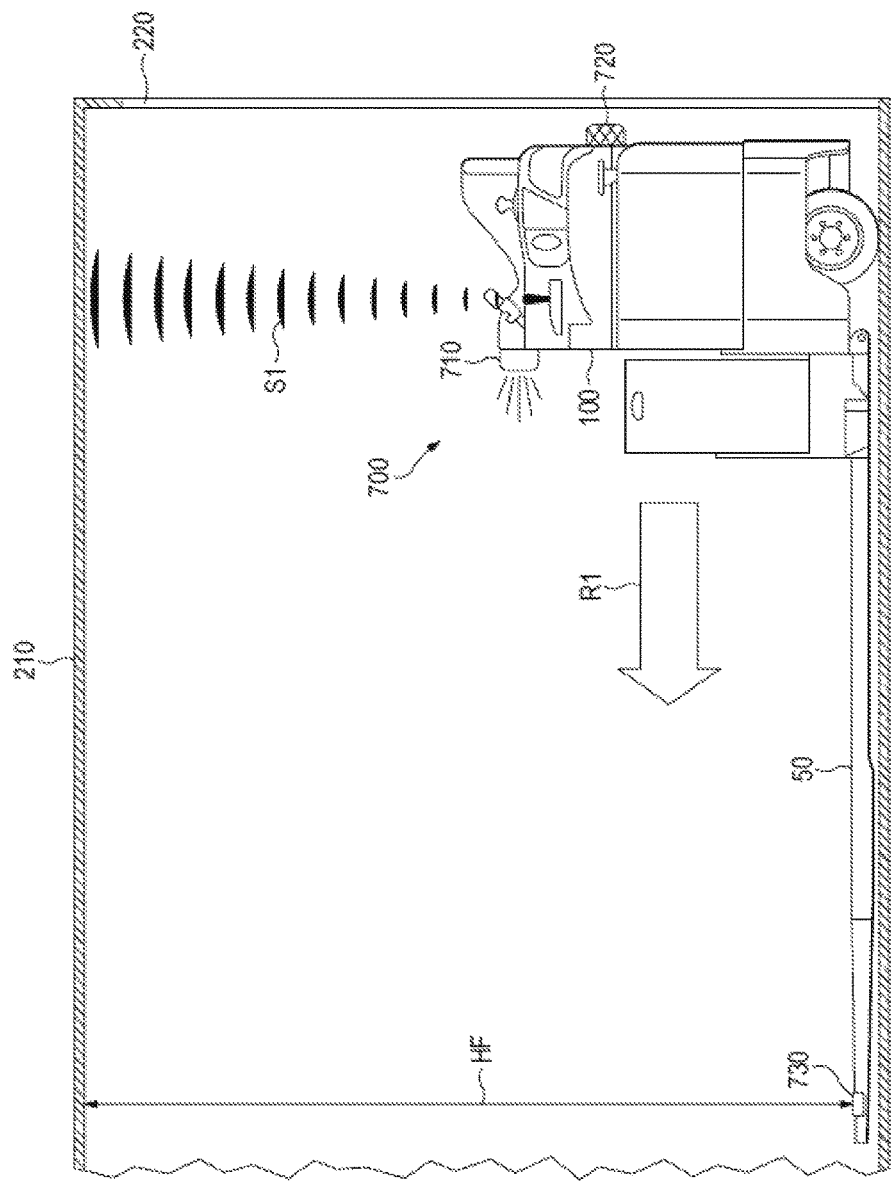
FIG. 7A illustrates an example environmental detection system in a first mode of operation.

FIG. 7A illustrates an example environmental detection system 700 in a first mode of operation. The first mode of operation may comprise a first set of one or more operations. In some examples, the first set of operation may be associated with a light activation system. The light activation system may comprise a first light 710 and a second light 720.

Environmental detection system 700 may be configured to generate and/or to receive a first set of signals S1. First set of signals S1 may indicate a distance or height associated with a first area of operation, such as area of operation 210. In some examples, area of operation 210 may be associated with a container, trailer, or other type of structure with a reduced overhead operating clearance.

In response to detecting first set of signals S1, environmental detection system 700 may be configured to activate or turn on first light 710. First light 710 may be configured to direct light in a direction corresponding to a first direction R1 of vehicle 100, such as with vehicle 100 pointed in a forks-first direction towards an interior of area of operation 210. Accordingly, first light 710 may be used to illuminate the interior of area of operation 210 such as when vehicle 100 is loading and/or unloading an object contained within a trailer. In some examples, first light 710 may be activated anytime that vehicle 100 is moving in first direction R1. In other examples, first light 710 may be activated in response to both detecting first set of signals S1 and detecting vehicle 100 is moving in first direction R1.

First set of signals S1 may be generated and/or received by a sensor mounted on vehicle 100. In some examples, a sensor 730 may be mounted at or near the tip of forks 50. First light 710 may be activated when the tip of forks 50 enters area of operation 210. one or more sensors, such as sensor 730, may be used to determine a maximum lift distance HF. Lift distance HF may be restricted by environmental detection system 700 when vehicle 100 is operating within area of operation 210. For example, in response to detecting first set of signals S1, environmental detection system 700 may be configured to restrict lift distance HF.

Environmental detection system 700 may be configured to enter the first mode of operation after vehicle 100 passes through the entrance 220 of area of operation 210. For example, vehicle 100 may pass through entrance 220 after entering a trailer from a loading dock, such as described with reference to FIG. 4. In some examples, the distance or operating height associated with area of operation 210 may fall within second range R2 of FIG. 6.

FIG. 7B illustrates the example environmental detection system 700 of FIG. 7A in a second mode of operation. The second mode of operation may comprise a second set of one or more operations. In some examples, the second set of operation may be associated with a light activation system.

Additionally, environmental detection system 700 may be configured to generate and/or to receive a second set of signals S2. Second set of signals S2 may indicate a distance or height associated with a second area of operation. In some examples, the second area of operation may be associated with a warehouse or building having an increase overhead operating clearance as compared to first area of operation 210. In other examples, the second area of operation may be associated with operation of vehicle 100 outside or under an open sky.

In response to detecting second set of signals S2, environmental detection system 700 may be configured to activate or turn on second light 720. Second light 720 may be configured to direct light in a second direction R2 opposite to first direction R1 of vehicle 100. Accordingly, second light 720 may be used to illuminate a direction of vehicle travel opposite forks 50. In some examples, second light 720 may be activated anytime that vehicle 100 is moving in second direction R2. In other examples, second light 720 may be activated in response to both detecting second set of signals S2 and detecting vehicle 100 is moving in second direction R2.

Environmental detection system 700 may be configured to enter the second mode of operation after vehicle 100 passes through the entrance 220 of area of operation 210. For example, vehicle 100 may pass through entrance 220 after exiting a trailer, such as described with reference to FIG. 4. In some examples, the distance or operating height associated with the second area of operation may fall within fourth range R4 of FIG. 6. In still other examples, the distance or operating height associated with the second area of operation may fall within fifth range R5 of FIG. 6.

Environmental detection system 700 may be configured to deactivate the first set of operations in response to entering the second mode of operation. Similarly, environmental detection system 700 may be configured to deactivate the second set of operations in response to entering the first mode of operation. In examples where environmental detection system 700 is configured to operate a light activation system, first light 710 may be turned off when second light 720 is turned on and, similarly, second light 720 may be turned off when first light 710 is turned on.

Additionally, environmental detection system 700 may be configured to activate and/or deactivate one or more operations after a time delay. In some examples, first light 710 may be turned off after a predetermined period of time following the receipt of second set of signals S2 and/or a determination that vehicle 100 is traveling in second direction R2. Additionally, second light 720 may be turned on immediately upon receipt of second set of signals S2 and/or a determination that vehicle 100 is traveling in second direction R2. Accordingly, first light 710 and second light 720 may temporarily both be on at the same time, e.g., during the predetermined period of time.

Although some of the above example modes of operation of environmental detection system 700 include operation of a light activation system, other types of systems and/or operations associated with vehicle 100 are contemplated herein such as a hydraulic system, a traction control system, a steering control system, a vehicle coast control system, a braking system, a loading dock securing system, a door/entry system, a building lighting system, a building alarm/security system, an automated vehicle guidance system, other types of vehicle systems and/or environmental systems, or any combination thereof.

Figure 8:
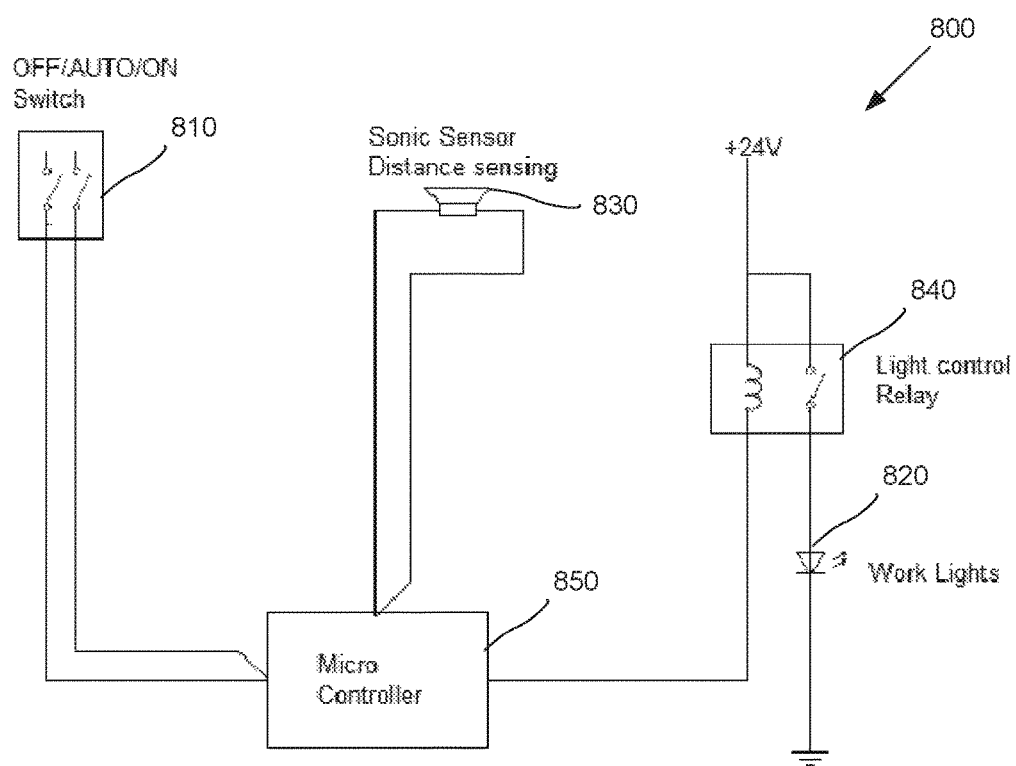
FIG. 8 illustrates a simplified schematic diagram of an example environmental detection system.

FIG. 8 illustrates a simplified schematic diagram of an example environmental detection system 800. Detection system 800 may be configured to actuate and/or operate an automated vehicle light system. For example, the vehicle light system may comprise one or more lights, such as work lights 820. An actuation control 810 may be provided to select one or more modes of operation of detection system 800 and/or the vehicle light system. In some examples, actuation control 810 may comprise or be configured to enable a manual 'on' mode of operation, a manual 'off' mode of operation, one or more automated modes of operation, other modes of operation, or any combination thereof.

Actuation control 810 may comprise a number of binary switches. For example, two binary switches may be used to select up to four different modes of operation. In application, each mode of operation may be associated with a button or toggle, for example, which a vehicle operator could activate.

In some examples, the one or more automated modes of operation may be associated with different operating environments. A first automated mode of operation may be associated with operation of a vehicle within an enclosed or confined area, such as a trailer. Additionally, a second automated mode of operation may be associated with operation of a vehicle in a relatively larger space, such as a warehouse. Different operational parameters, thresholds, ranges, etc. may be associated with each mode of operation.

Actuation control 810 may be operatively coupled to a processing device 850. Processing device 850 may be configured to receive input from actuation control 810 and one or more sensors 830. Additionally, processing device 850 may be configured to receive input from a vehicle, such as vehicle speed, engine speed, steering angle, lift height, load weight, etc. In response to receiving one or more of the various inputs, processing device 850 may be configured to generate an output and control operation of the vehicle lighting system or other type of vehicle system.

Work lights 820 may be operatively coupled to processing device 850 via a light control relay device 840. Light control relay device 840 may be configured to evaluate the output generated by processing device 850 and to determine whether to turn on, or to turn off, work lights 820. In some examples, light control device 840 may comprise a delay circuit to avoid work lights 820 from intermittently turning on and off.

Figure 9:
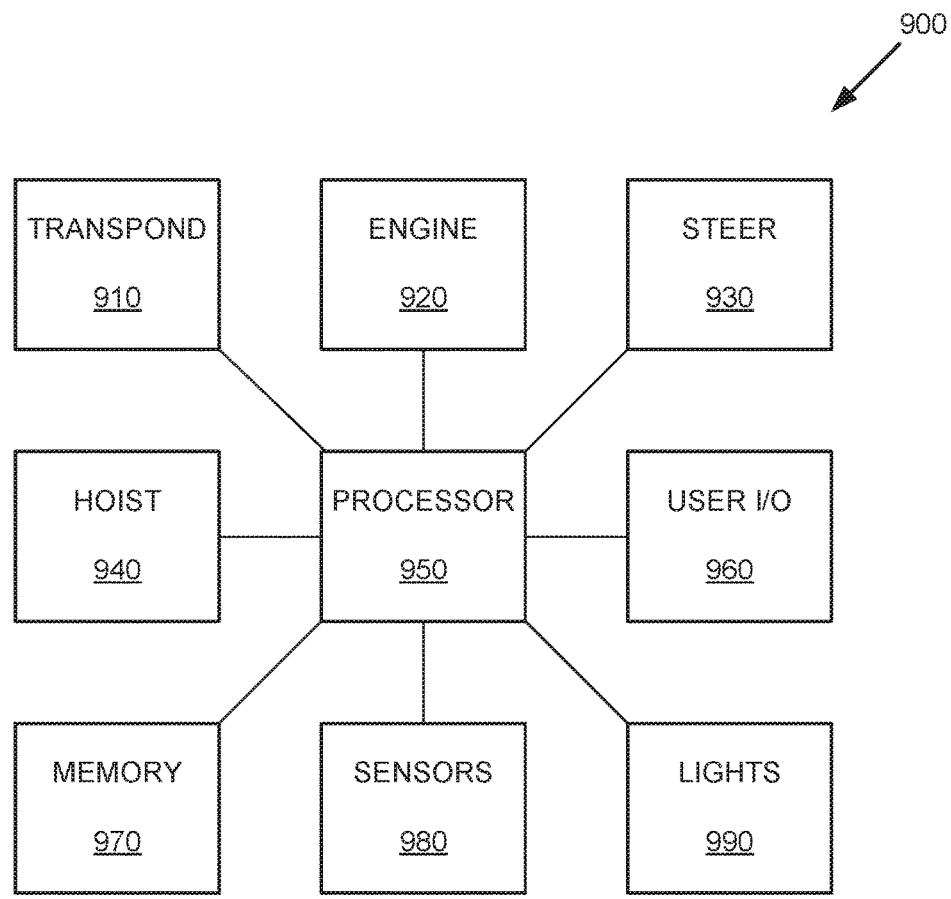
FIG. 9 illustrates a simplified block diagram of an example environmental detection system.

FIG. 9 illustrates a simplified block diagram of an example environmental detection system 900. Environmental detection system 900 may comprise a processing device 950 configured to perform one or more operations based, at least in part, on instructions stored on a memory device 970. Additionally, processing device 950 may be communicatively coupled to a transponder 910, an engine 920, a steering system 930, a hoist device 940, one or more user input/output (I/O) devices 960, one or more sensors 980, and one or more lights 990.

The one or more sensors 980 may comprise a detection device configured to transmit and/or receive one or more signals in a generally vertical direction above a vehicle. The vehicle may be associated with one or more vehicle systems and/or vehicle devices, such as the engine 920, steering system 930, hoist device 940, and one or more lights 990 illustrated in FIG. 9 and as described elsewhere in the present application. In some examples, the signals may comprise acoustic or ultrasonic signals which are transmitted towards a reflective surface of an object, such as a ceiling or a container top. The reflected signals may be received by the one or more sensors 980 to determine the distance travelled by the one or more acoustic signals based, at least in part, on the measured time of flight associated with the transmission and receipt of the one or more acoustic signals.

Processing device 950 may be configured to determine a distance travelled by the one or more signals based, at least in part, on a measured time of flight associated with the transmission and receipt of the one or more signals. In some examples, the distance may indicate the distance from the top of the vehicle to a ceiling located above the vehicle. In some examples, processing device 950 may be configured to add the height of the one or more sensors 980 in order to determine the height of the ceiling when measured to the floor.

The one or more user I/O devices 960 may be configured to select a user preference for operation of the vehicle systems and/or devices. A user may select an automated response of the one or more lights 990 based, as least in part, on the distance travelled by the one or more signals. For example, the one or more user I/O devices 960 may be configured to request that the one or more lights 990 are activated when the vehicle enters a trailer or other confined space having a predetermined height or range of heights. Similarly the one or more user I/O devices 960 may be configured to request that the one or more lights 990 are deactivated when the vehicle exits the trailer or other confined space.

Memory device 970 may be configured to store a number of ranges of distances. Each range of distance may be associated with one or more threshold distances. For example, each range may be defined by upper and lower boundaries comprising two threshold distances. In some examples, an overhead clearance of the vehicle may be determined by comparing the distance travelled by the one or more signals with one or more of the threshold distances. Each range of distances may be associated with a particular overhead clearance. Similarly, each overhead clearance may be associated with a different mode of operation of the one or more vehicle systems and/or devices. The vehicle system may be operated in a first mode of operation in response to determining a first overhead clearance of the vehicle, and the vehicle system may be operated in a second mode of operation in response to determining a second overhead clearance of the vehicle.

In some examples, the one or more lights 990 may comprise a first light and a second light. In the first mode of operation the first light may be activated, and in the second mode of operation the second light may be activated. When the second light is activated, the first light may be automatically deactivated and, conversely, when the first light is activated, the second light may be automatically deactivated.

In other examples, the vehicle system may comprise a traction motor, such as engine 920. In the first mode of operation the traction motor may be operated at a standard operating speed, and in the second mode of operation the traction motor may be restricted to a reduced operating speed which is less than the standard operating speed.

In still other examples, the first mode of operation may comprise enabling the hoisting device 940 to operate at a standard lift height, and in the second mode of operation the hoisting device 940 may be restricted to operate at a reduced lift height which is less than the standard lift height.

Figure 10:
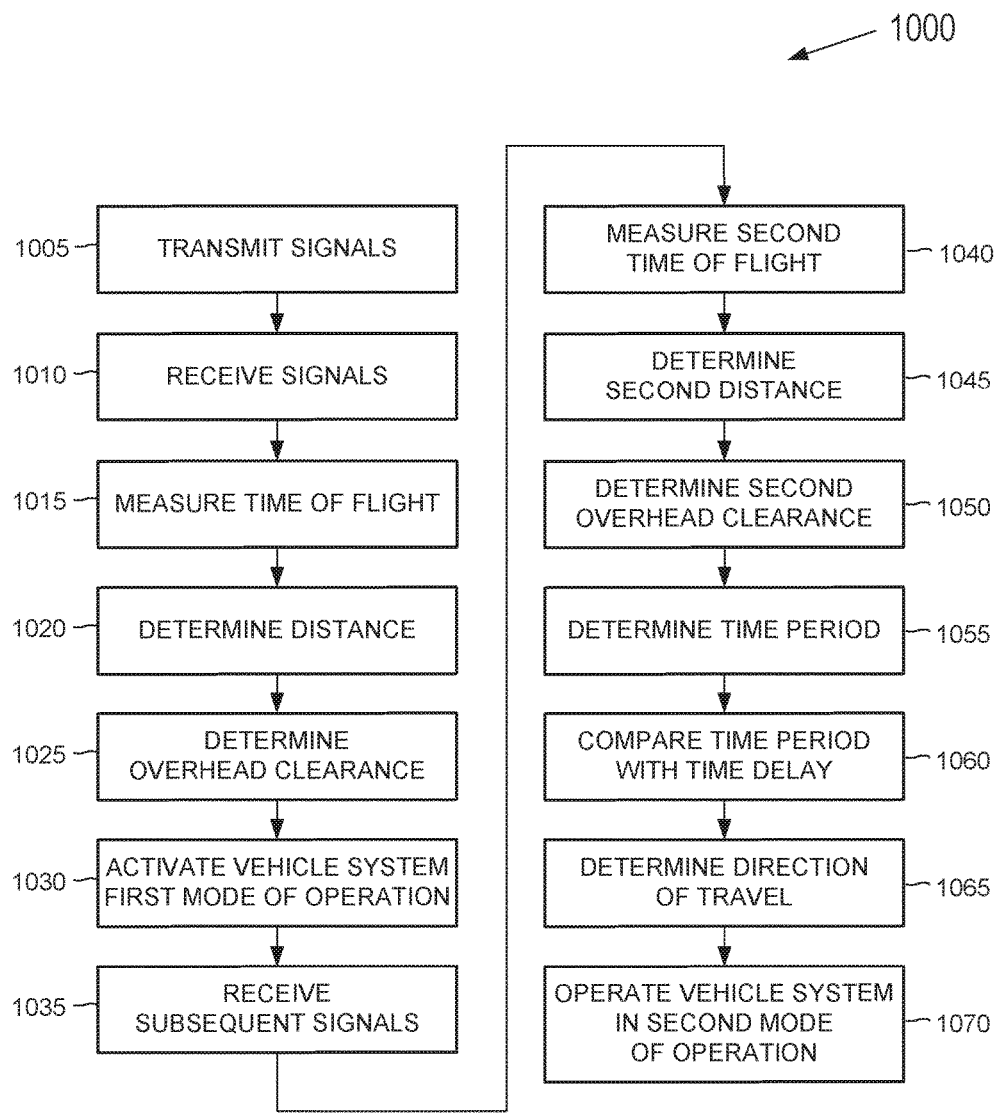
FIG. 10 illustrates an example process of activating a vehicle related system in response to detecting one or more environmental parameters.

FIG. 10 illustrates an example process 1000 of activating a vehicle related system in response to detecting one or more environmental parameters. At operation 1005, one or more signals may be transmitted in a generally vertical direction above a vehicle, wherein the vehicle is associated with a vehicle system.

At operation 1010, the one or more signals may be received by a detection device.

At operation 1015, a time of flight associated with the transmission and receipt of the one or more signals may be measured.

At operation 1020, a distance travelled by the one or more signals may be determined based, at least in part, on the measured time of flight.

At operation 1025, the distance travelled may be compared with one or more threshold distances to determine an overhead clearance of the vehicle. In some examples, the overhead clearance may be associated with a first range of distances.

At operation 1030, the vehicle system may be activated in response to determining the overhead clearance, in some examples, the vehicle system may be operated in a first mode of operation in response to determining the overhead clearance is associated with the first range of distances.

At operation 1035, one or more subsequent signals may be received by the detection device.

At operation 1040, a second time of flight associated with the transmission and receipt of the one or more subsequent signals may be measured.

At operation 1045, a second distance travelled by the one or more subsequent signals may be determined based, at least in part, on the second time of flight.

At operation 1050, the second distance travelled may be compared with one or more threshold distances to determine a second overhead clearance of the vehicle. The second overhead clearance may be determined based, at least in part, on the transmission and receipt of one or more subsequent signals in a generally vertical direction above the vehicle. In some examples, the second overhead clearance may be associated with a second range of distances.

At operation 1055, a time period in which the one or more subsequent signals are transmitted and received may be determined.

At operation 1060, the time period may be compared with a predetermined time delay.

At operation 1065, a direction of vehicle travel may be determined. In some examples, the direction of vehicle travel may comprise a first direction of travel, a second direction of travel, a forward direction of travel, a reverse direction of travel, a forks-first direction of travel, or a forks-aft direction of travel. In some examples, the vehicle system may be operated in the first mode of operation in response to both determining the first overhead clearance and determining that the vehicle is operating in a first direction of travel.

At operation 1070, the vehicle system may be operated in a second mode of operation in response to determining the second overhead clearance. In some examples, the vehicle system may be operated in the second mode of operation in response to both determining the second overhead clearance and determining that the time period exceeds the predetermined time delay. In still other examples, the vehicle system may be operated in the second mode of operation in response to both determining the second overhead clearance and determining that the vehicle is operating in a second direction opposite the first direction of travel.

Figure 11:
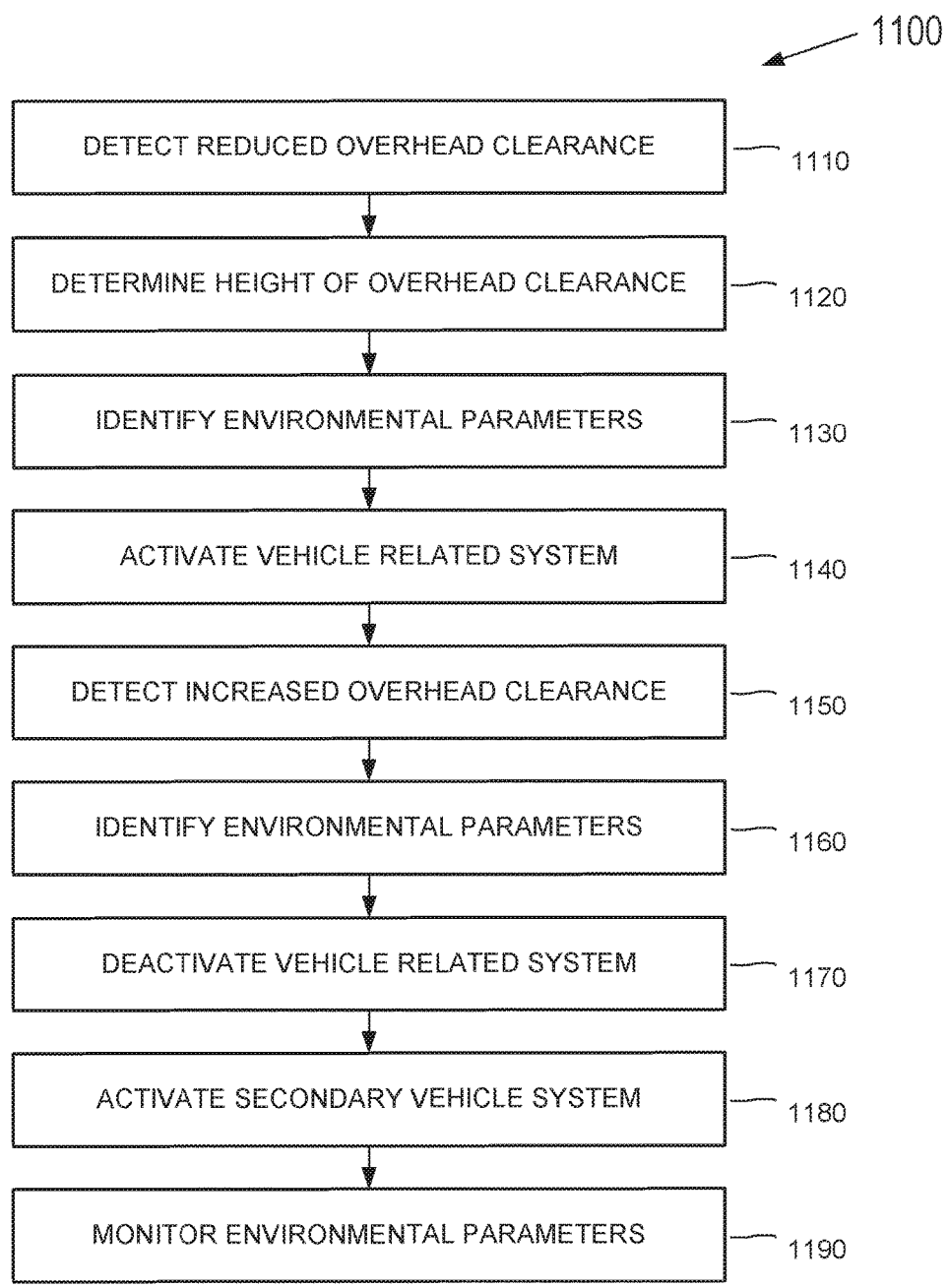
FIG. 11 illustrates a further example process of activating a vehicle related system in response to detecting one or more environmental parameters.

FIG. 11 illustrates a further example process 1100 of activating a vehicle related system in response to detecting one or more environmental parameters. At operation 1110, a reduced overhead clearance is detected.

At operation 1120, a height of the overhead clearance is determined.

At operation 1130, one or more environmental parameters may be identified. The one or more environmental parameters may comprise: a direction of vehicle travel, a lateral vehicle clearance, aground clearance, whether the vehicle is traveling in a loaded or unloaded condition, a change in distance travelled by the one or more signals over time, a duration that the one or more signals indicate a given distance or range of distances, a vehicle identification, a trailer identification, other types of environmental parameters, or any combination thereof.

At operation 1140, a vehicle related system may be activated. The vehicle related system may be activated in response to determining the reduced overhead clearance. In some examples, the vehicle related system may be activated in response to a combination of determining the reduced overhead clearance and identifying the one or more environmental parameters.

At operation 1150, an increased overhead clearance is detected.

At operation 1160, one or more environmental parameters may be identified in conjunction with detecting the increased overhead clearance.

At operation 1170, the vehicle related system may be deactivated.

At operation 1180 a secondary vehicle related system may be activated. The secondary vehicle related system may be activated in response to determining the increased overhead clearance. In some examples, the secondary vehicle related system may be activated in response to a combination of determining the increased overhead clearance, identifying the one or more environmental parameters, and/or deactivating the vehicle related system.

At operation 1190, the environmental parameters may be continuously and or intermittently monitored. For example, in the event of any change to the environmental parameters, the secondary vehicle system may be deactivated.

In various examples, the vehicle system may comprise one or more of a hydraulic system, a traction control system, a steering control system, a vehicle coast control system, a braking system, a loading dock securing system, a door/entry system, a building lighting system, a building alarm/security system, an automated vehicle guidance system, other types of vehicle systems and/or environmental systems, or any combination thereof.

Processes 1000 and 1100 and the associated operations described therein, may be performed by one or more processing devices, such as control system 450 of FIG. 4, processing device 850 of FIG. 8, and/or processing device 950 of FIG. 9. For the sake of convenience, the operations are described as various interconnected functional blocks or diagrams. This is not necessary, however, and there may be cases where these functional blocks or diagrams are equivalently aggregated into a single logic device, program or operation with unclear boundaries.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. One or more of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or vehicle system manager, or may be provided as a portable electronic device that may be configured to interface with a networked system, locally and/or remotely, via a wireless transmission.

The above examples are provided for illustrative purposes only, and other types and/or combinations of sensors, systems, vehicles, and environmental parameters are contemplated herein.

Having described and illustrated various examples herein, it should be apparent that other examples may be modified in arrangement and detail. We claim all modifications and variations coming within the spirit and scope of the following claims.

The invention claimed is:

1. A detection system, comprising:
    a sensing device configured to detect one or more signals travelling in a generally vertical direction above a vehicle, wherein the vehicle is associated with an operational range of overhead distances; and
    a processing device configured to:
        operate a vehicle system in a mode of operation;
        compare a distance travelled by the one or more signals in the generally vertical direction with the operational range of overhead distances to determine a change in overhead clearance of the vehicle; and
modify the mode of operation of the vehicle system in response to determining the change in overhead clearance.

2. The detection system of claim 1, wherein the vehicle system is configured to operate in either a first mode of operation or a second mode of operation, and wherein the processing device modifies the mode of operation by commanding the vehicle system to change operation from the first mode of operation to the second mode of operation in response to determining the change in overhead clearance.

3. The detection system of claim 2, wherein the change in overhead clearance identifies a reduced overhead clearance.

4. The detection system of claim 3, wherein the first mode of operation comprises a standard mode of operation of the vehicle system, and wherein the second mode of operation comprises a restricted mode operation of the vehicle system that is commanded by the processing device in response to identifying the reduced overhead clearance.

5. The detection system of claim 4, wherein the vehicle system comprises a hoisting system associated with a maximum lift height, and wherein the processing device restricts an allowable lift height of the hoisting system in the second mode of operation to less than the maximum lift height.

6. The detection system of claim 4, wherein the vehicle system comprises a traction system associated with a maximum travel speed, and wherein the processing device restricts an allowable travel speed of the traction system in the second mode of operation to less than the maximum travel speed.

7. The detection system of claim 3, wherein the processing device is configured to prohibit the vehicle system from operating in the first mode of operation in response to identifying the reduced overhead clearance.

8. The detection system of claim 3, wherein the processing device is configured to disable the vehicle system in response to identifying the reduced overhead clearance.

9. The detection system of claim 3, wherein the processing device is configured to activate the vehicle system in response to identifying the reduced overhead clearance.

10. The detection system of claim 9, wherein the vehicle system comprises a vehicle lighting system, and wherein the processing device is configured to deactivate the vehicle lighting system in the first mode of operation.

11. A method, comprising:
detecting one or more signals travelling in a generally vertical direction above a vehicle, wherein the vehicle is associated with an operational range of overhead distances;
operating, by a processing device, a vehicle system in a mode of operation;
comparing, by the processing device, a distance travelled by the one or more signals in the generally vertical direction with the operational range of overhead distances,
determining, by the processing device, a change in overhead clearance of the vehicle; and
modifying the mode of operation of the vehicle system in response to determining the change in overhead clearance.

12. The method of claim 11, wherein the vehicle system operates in either a first mode of operation or a second mode of operation, and wherein modifying the mode of operation comprises commanding the vehicle system to change from the first mode of operation to the second mode of operation in response to determining the change in overhead clearance.

13. The method of claim 12, wherein the change in overhead clearance identifies a reduced overhead clearance.

14. The method of claim 13, wherein the first mode of operation comprises a standard mode of operation of the vehicle system, wherein the second mode of operation comprises a restricted mode of operation of the vehicle system, and wherein modifying the mode of operation comprises commanding the vehicle system to operate in the restricted mode of operation in response to identifying the reduced overhead clearance.

15. The method of claim 14, wherein the vehicle system comprises a hoisting system associated with a maximum lift height, and wherein an allowable lift height of the hoisting system is restricted in the second mode of operation to less than the maximum lift height.

16. The method of claim 14, wherein the vehicle system comprises a traction system associated with a maximum travel speed, and wherein an allowable travel speed of the traction system is restricted in the second mode of operation to less than the maximum travel speed.

17. The method of claim 13, wherein modifying the mode of operation comprises activating the vehicle system in response to identifying the reduced overhead clearance.

18. The method of claim 17, wherein the vehicle system comprises a vehicle lighting system, and wherein the vehicle lighting system is deactivated in the first mode of operation.

19. An apparatus, comprising:
means for detecting one or more signals travelling in a generally vertical direction above a vehicle, wherein the vehicle is associated with an operational range of overhead distances;
means for operating the vehicle in a mode of operation; and
means for comparing a distance travelled by the one or more signals in the generally vertical direction with the operational range of overhead distances in order to determine a change in overhead clearance of the vehicle, wherein the mode of operation of the vehicle is modified in response to determining the change in overhead clearance.

20. The apparatus of claim 19, wherein the means for operating comprises means for operating the vehicle in either a first mode of operation or a second mode of operation, and wherein the mode of operation is modified by changing vehicle operation from the first mode of operation to the second mode of operation in response to determining the change in overhead clearance.

* * * * *